US010317987B2

(12) United States Patent
Yang et al.

(10) Patent No.: US 10,317,987 B2
(45) Date of Patent: Jun. 11, 2019

(54) WEARABLE DEVICE AND APPLICATION SYSTEM

(71) Applicant: BOE TECHNOLOGY GROUP CO., LTD., Beijing (CN)

(72) Inventors: Jiuxia Yang, Beijing (CN); Feng Bai, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 338 days.

(21) Appl. No.: 15/504,769

(22) PCT Filed: Jul. 29, 2016

(86) PCT No.: PCT/CN2016/092311
§ 371 (c)(1),
(2) Date: Feb. 17, 2017

(87) PCT Pub. No.: WO2017/076076
PCT Pub. Date: May 11, 2017

(65) Prior Publication Data
US 2017/0277252 A1 Sep. 28, 2017

(30) Foreign Application Priority Data
Nov. 5, 2015 (CN) .......................... 2015 1 0751029

(51) Int. Cl.
G05B 11/01 (2006.01)
G06F 3/01 (2006.01)
G06F 1/16 (2006.01)

(52) U.S. Cl.
CPC ................ G06F 3/01 (2013.01); G06F 1/163 (2013.01); G06F 3/015 (2013.01)

(58) Field of Classification Search
CPC .................................. G06F 3/01; G06F 3/015
(Continued)

(56) References Cited

U.S. PATENT DOCUMENTS

2014/0347265 A1* 11/2014 Aimone ................. G09G 3/003
345/156
2015/0091791 A1* 4/2015 Segal .................... G06F 16/436
345/156
(Continued)

FOREIGN PATENT DOCUMENTS

CN 101373402 A 2/2009
CN 102289285 A 12/2011
(Continued)

OTHER PUBLICATIONS

First Office Action dated Jul. 26, 2016 in corresponding Chinese Application No. 201510751029.8.
(Continued)

Primary Examiner — Tai T Nguyen
(74) Attorney, Agent, or Firm — Nath, Goldberg & Meyer; Joshua B. Goldberg; Stanley N. Protigal

(57) ABSTRACT

The present invention provides a wearable device and an application system. The wearable device is configured to be worn by a wearer and includes: a brain wave collection unit configured to collect a brain wave of the wearer; a determination unit configured to obtain an instruction according to the brain wave collected by the brain wave collection unit and send the instruction to a sending unit; and the sending unit configured to send control information to an application device according to the instruction sent from the determination unit. The wearable device of the present invention can be used to control application device such as household applications and especially applies to control of application device by special populations or under special conditions.

11 Claims, 3 Drawing Sheets

(58) Field of Classification Search
USPC .......... 340/12.24, 10.1, 540, 541, 575, 576,
340/825.19; 600/300, 544
See application file for complete search history.

(56) References Cited

U.S. PATENT DOCUMENTS

2017/0031449 A1* 2/2017 Karsten ............... G06F 19/3418
2018/0239430 A1* 8/2018 Tadi ................... G02B 27/0172

FOREIGN PATENT DOCUMENTS

| | | |
|---|---|---|
| CN | 103076881 A | 5/2013 |
| CN | 103646587 A | 3/2014 |
| CN | 104679254 A | 6/2015 |
| CN | 104914727 A | 9/2015 |
| CN | 105468140 A | 4/2016 |

OTHER PUBLICATIONS

International Search Report dated Nov. 3, 2016 issued in corresponding International Application No. PCT/CN2016/092311 along with an English translation of the Written Opinion of the International Searching Authority.
Second Office Action dated Jan. 23, 2017 in corresponding Chinese Application No. 201510751029.8.

* cited by examiner

US 10,317,987 B2

WEARABLE DEVICE AND APPLICATION SYSTEM

This is a National Phase Application filed under 35 U.S.C. 371 as a national stage of PCT/CN2016/092311, filed Jul. 29, 2016, an application claiming the benefit of Chinese Application No. 201510751029.8, filed Nov. 5, 2015, the content of each of which is hereby incorporated by reference in its entirety.

TECHNICAL FIELD

The present invention relates to the field of device control technology, and in particular relates to a wearable device and an application system.

BACKGROUND

With the development of technology, intellectualized degrees of devices such as household appliances are continuously improved, bringing convenience and efficiency to peoples' daily life.

However, under the circumstance of the Internet of Things (IOT), control of a device such as a household application is generally achieved by means of a mobile phone, a computer, or the like, but in some special applications (e.g., under a dark circumstance), or for some special populations (e.g., visually impaired people, etc.), convenient control of a device such as a household application can hardly be achieved.

SUMMARY

In view of the problem of inconvenient control of an application device for special populations or under special conditions in the prior art, the present invention provides a wearable device which can control an application device conveniently, and has extensive application and high accuracy, and an application system including the wearable device.

In an aspect, the present invention provides a wearable device, configured to be worn by a wearer and including:

a brain wave collection unit, which is configured to collect a brain wave of the wearer;

a determination unit, which is configured to obtain an instruction according to the brain wave collected by the brain wave collection unit and send the instruction to a sending unit; and the sending unit, which is configured to send control information to an application device according to the instruction sent from the determination unit.

Optionally, the wearable device further includes a prompt unit, wherein:

the determination unit is configured to obtain an instruction according to the brain wave collected by the brain wave collection unit and send the instruction to the prompt unit;

the prompt unit is configured to send a prompt to the wearer upon receipt of the instruction sent from the determination unit, the prompt including a prompt that reminds the wearer to confirm or cancel the instruction;

the determination unit is further configured to receive a feedback indicating that the wearer confirms or cancels the instruction, and send the instruction confirmed by the wearer to the sending unit after receiving the feedback indicating that the wearer confirms the instruction; and the sending unit is configured to send control information to the application device according to the instruction confirmed by the wearer and sent from the determination unit.

Optionally, the determination unit obtains an instruction according to the brain wave collected by the brain wave collection unit in the following way: comparing the brain wave collected by the brain wave collection unit with electroencephalograms pre-stored in a database, and if a electroencephalogram matching the brain wave is found, setting an instruction corresponding to the electroencephalogram as the instruction; the database including instructions and the electroencephalograms in one-to-one correspondence.

Optionally, the sending unit sends the control information to the application device wirelessly.

Optionally, the prompt unit is configured to send the prompt to the wearer by way of playing a sound and/or displaying a picture.

Optionally, the sending unit is a radio frequency transmission unit.

Optionally, a transmission frequency of the radio frequency transmission unit is larger than or equal to 10 MHz.

Optionally, the wearable device further includes: a positioning unit, which is configured to obtain relative positional relation between the wearer and the application device and sending the obtained relative positional relation to the prompt unit; and the prompt unit is further configured to send a prompt about the relative positional relation between the wearer and the application device to the wearer.

Optionally, the wearable device further includes: a control unit, which is configured to receive the instruction from the determination unit, encode the instruction and send the encoded instruction to the sending unit.

In another aspect, the present invention provides an application system, including:

the above-described wearable device; and at least one application device, wherein each application device includes a receiving unit configured to receive and decode the control information sent from the sending unit of the wearable device, so that the application device operates according to the control information.

Optionally, the application device includes a household application.

Optionally, the application device is an IOT application device.

The wearable device of the present invention can collect a brain wave of a wearer and send control information to an application device according to the collected brain wave, therefore, the wearer can control the application device by using his/her "thought" directly, and as a result, the wearable device can be used in special circumstances or by special populations. In addition, the wearable device includes therein a determination unit and a prompt unit, thus, after the determination unit obtains the wearer's possible thought (instruction) by analyzing the collected brain wave, the prompt unit may firstly send the thought to the wearer to confirm whether the thought is the wearer's real thought, and control information is sent out only after the thought is confirmed by the wearer. Therefore, accuracy of the instruction sent by the wearable device can be ensured and user experience is improved.

The wearable device of the present invention can be used to control an application device such as a household application, and especially applies to control of an application device by special populations or under special conditions.

DETAILED DESCRIPTION

To make those skilled in the art better understand technical solutions of the present invention, the present invention will be described in detail below in conjunction with the accompanying drawings and specific implementations.

Figure 1:
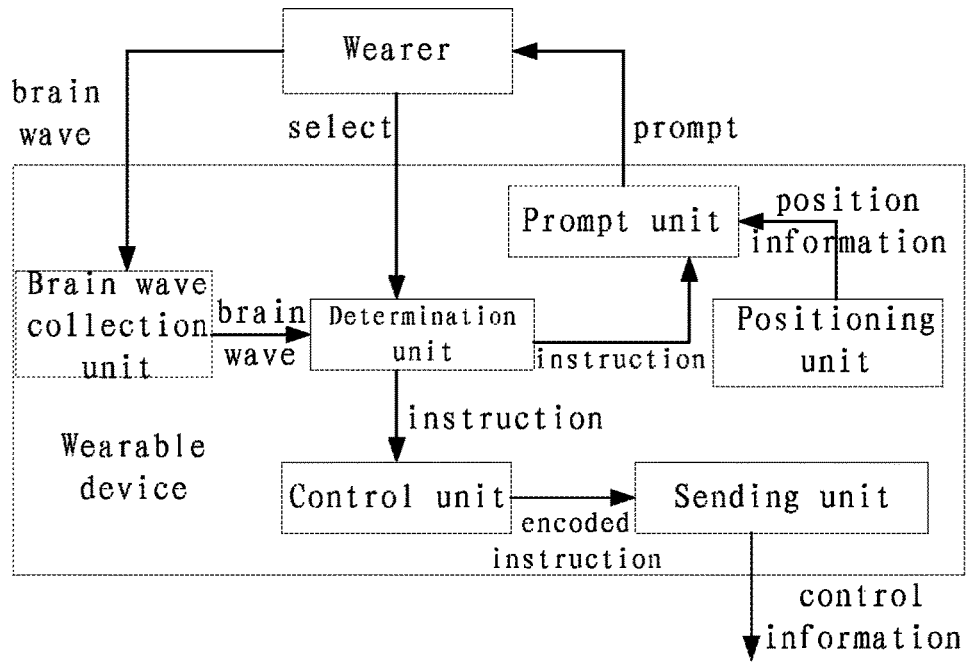
FIG. 1 is a block diagram of a structure of a wearable device according to an embodiment of the present invention.
Figure 2:
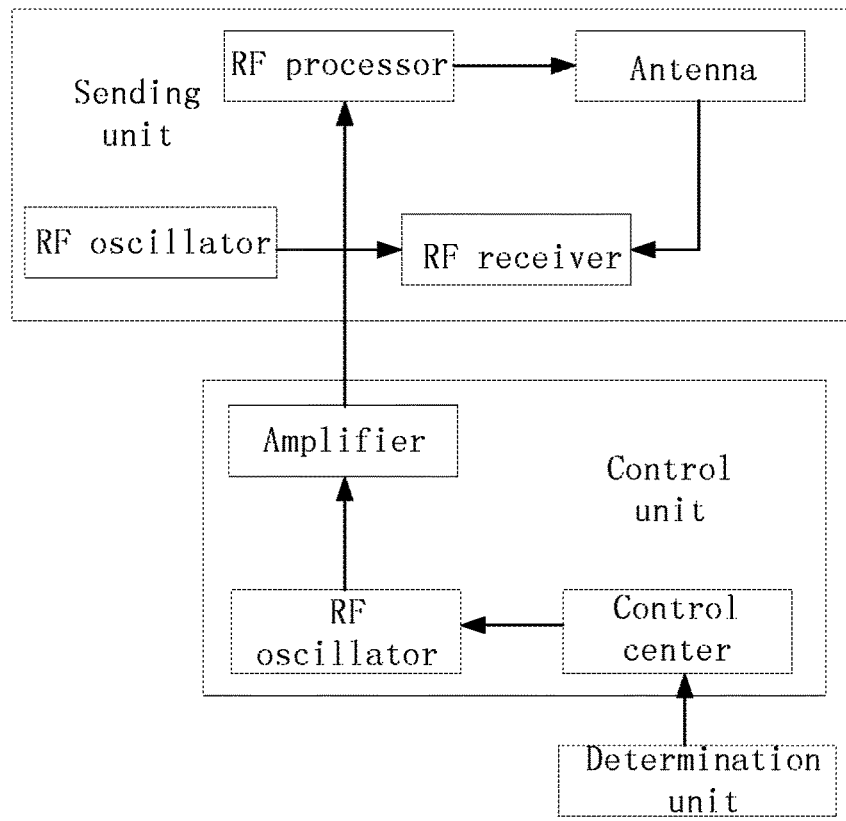
FIG. 2 is a block diagram of structures of a control unit and a sending unit in a wearable device according to an embodiment of the present invention.

As shown in FIGS. 1 and 2, embodiments of the present invention provide a wearable device, which is configured to be worn by a wearer. The wearable device can be worn on a wearer (especially on the head, so as to collect a brain wave conveniently). The form of the wearable device is not limited in the present invention, as long as the wearable device can collect a brain wave of a wearer after it is worn by the wearer. For example, the wearable device may be in the form of glasses, a helmet, a headphone, etc.

As shown in FIG. 1, the wearable device includes a brain wave collection unit, a determination unit and a sending unit.

The brain wave collection unit is configured to collect a brain wave of the wearer. In some exemplary embodiments, the brain wave collection unit may be a patch electrode configured to contact a certain position of head of the wearer, or the like, and collects a brain wave of the wearer when a certain thinking activity occurs in the brain of the wearer. In some exemplary embodiments, the brain wave collection unit may be further configured to filter the collected brain wave to reduce or eliminate noise.

The determination unit is configured to obtain an instruction according to the brain wave collected by the brain wave collection unit and send the instruction to the sending unit. In some exemplary embodiments, the determination unit may be a chip connected to the brain wave collection unit, or the like, and may analyze the brain wave collected by the brain wave collection unit to obtain an instruction (e.g., an instruction of turning on a computer, turning off a television, or the like) corresponding to the brain wave, and sending the instruction to the sending unit.

In some exemplary embodiments, the determination unit may obtain the instruction according to the brain wave collected by the brain wave collection unit in the following way: the brain wave collected by the brain wave collection unit is compared with electroencephalograms pre-stored in a database, and if an electroencephalogram matching the collected brain wave is found, the instruction corresponding to the electroencephalogram is. The database includes instructions and the electroencephalograms in one-to-one correspondence.

That is to say, the database may be built in advance, and correspondence between the electroencephalograms and the instructions is included in the database, for example, an electroencephalogram A corresponds to an instruction of turning on a computer, an electroencephalogram B corresponds to an instruction of turning off a television, and the like. When the brain wave collection unit collects a brain wave, waveform of the collected brain wave is compared with each of the electroencephalograms, and a matching electroencephalogram (having a difference within a predetermined range) is searched. It is considered that the wearer is not meant to give an order at that time if no matching electroencephalogram is found, and if a matching electroencephalogram is found, the instruction corresponding to the matching electroencephalogram is obtained as a result of the analysis according to the correspondence between the electroencephalograms and the instructions in the database.

Here, there are various methods for building the database. For example, it is feasible to let some individuals think a certain instruction (for example, an instruction of turning on a computer) and collect their brain waves, and then an average of these brain waves is taken as the electroencephalogram corresponding to the instruction of turning on a computer. As another example, it is also feasible that the wearer customizes the correspondence between the electroencephalograms and the instructions using the wearable device, for instance, the wearer thinks "an instruction of turning on a computer" in his/her mind, collects a brain wave at this moment by using the wearable device, and defines that the electroencephalogram corresponds to the instruction of turning on a computer.

The sending unit is configured to send control information to an application device according to the instruction. In some exemplary embodiments, after receiving the instruction sent by the determination unit, the sending unit sends a command (control information) corresponding to the instruction to a corresponding application device (computer, television, etc.), so as to achieve the purpose of controlling each application device (e.g., turning on a computer, turning off a television, etc.) by means of a brain wave. Because the wearable device is worn on a wearer, the sending unit preferably sends the control information wirelessly.

Preferably, the sending unit is a radio frequency (RF) transmission unit. Preferably, a transmission frequency of the radio frequency transmission unit is larger than or equal to 10 MHz, and further preferably, larger than or equal to 500 MHz.

Among various wireless transmission modes, RF transmission is relatively suitable to the present invention, and it accomplishes information transmission by using RF signals and space coupling transmission characteristics. Frequencies of the RF signals are preferably larger than or equal to 10 MHz, and in the IOT applications, the frequencies of the RF signals are preferably larger than or equal to 500 MHz.

As shown in FIG. 2, the sending unit may specifically include a RF oscillator (configured to generate transmission power and provide energy), a RF processor (configured to modulate a transmission signal), a RF receiver (configured to receive and demodulate a RF signal from an application device), an antenna, and other known structures, which are not described in detail herein.

In order to ensure accuracy of the instruction obtained by the determination unit (i.e., accuracy of control information to be sent from the sending unit to the application device), the wearable device may further include a prompt unit, which is configured to receive the instruction sent by the determination unit and send a prompt to the wearer upon receipt of the instruction, and the prompt includes a prompt that reminds the wearer to confirm or cancel the instruction. In this case, the determination unit sends the instruction obtained according to the brain wave to the prompt unit, so that the prompt unit sends out a prompt to remind the wearer to confirm or cancel the instruction (i.e., to determine whether the instruction is the wearer's real thought); meanwhile, the determination unit is further configured to receive a feedback indicating that the wearer confirms or cancels the instruction, that is, the determination unit receives the feedback of the wearer, so as to determine whether the instruction is correct (i.e., whether the instruction should be sent to the sending unit), and the determination unit is further configured to send the instruction confirmed by the wearer to the sending unit after receiving the feedback indicating that the wearer confirms the instruction. In this case, the sending unit is configured to send control information to the application device wirelessly according to the instruction confirmed by the wearer. Specifically, the wearer may give a feedback in various ways, for example, the wearer may press a button on the wearable device, touch a picture on a touch screen, or the like, alternatively, the wearer may think "confirm" in his/her mind to give a feedback by means of brain waves. In general, any method that allows the wearer to give a feedback of confirming or cancelling the instruction according to the prompt is feasible.

In some exemplary embodiments, the prompt unit may be configured to send a prompt to the wearer by way of playing a sound and/or displaying a picture.

That is to say, the prompt unit may send a prompt to the wearer in at least one of the following ways: playing a sound and displaying a picture (text is one type of picture), to allow the wearer to choose whether to confirm or cancel the current instruction. For example, when the determination unit obtains an instruction from analysis, the instruction is sent to the prompt unit, and the prompt unit plays a prompt voice "you want to turn on the computer, please confirm", or displays "you want to turn off the television, please select Yes to confirm or select No to cancel" on a display screen (e.g., lens of glasses), upon receipt of the instruction. In general, any implementation is feasible as long as the prompt unit can remind the wearer to give a feedback of confirming or cancelling the instruction.

In some exemplary embodiments, the wearable device may further include a positioning unit, which is configured to determine relative positional relation between the wearer and the application device and send the determined result to the prompt unit. In this case, the prompt unit is further configured to send out a prompt about the relative positional relation between the wearer and the application device.

That is to say, the relative positional relation between the wearer and the application device may be determined by the positioning unit, and the prompt unit may send a prompt about the relative positional relation to the wearer, so that the wearer may find the application device he/she wants to use according to the prompt sent from the prompt unit in the case that the wearer cannot find the application device due to special conditions such as dark environment. For example, when the wearer confirms the instruction of turning on a computer, the prompt unit may play a prompt voice "the computer is three meters ahead of you", so as to help the wearer find the computer, and the prompt voice indicates the relative positional relation between the wearer and the application device.

There are various methods for determining the relative positional relation between the wearer (i.e., the wearable device) and the application device. In one exemplary embodiment, each application device and the positioning unit include infrared ranging sensors corresponding to each other, so that the positioning unit may obtain the relative positional relation between the positioning unit and each application device according to the measured results of the infrared ranging sensors.

In some exemplary embodiments, the wearable device may further include a control unit, which is configured to receive the instruction (in a case where the prompt unit is not included, the instruction is the instruction determined by the determination unit according to the brain wave; in a case where the prompt unit is included, the instruction is the instruction confirmed by the wearer) from the determination unit, encode the instruction and send the encoded instruction to the sending unit.

Because format, signal strength, and the like of the instruction directly given by the determination unit may not meet the requirements of the sending unit, signals of the instruction may be sent to the sending unit for transmission after being processed (e.g., amplified, encoded, etc.) by the control unit.

As shown in FIG. 2, the control unit may specifically include a control center (configured to parse the instruction), a codec (configured to encode and decode a signal), an amplifier, and other known structures, which are not described in detail herein.

It can be seen that the wearable device of the embodiments can collect a brain wave of a wearer and send control information to an application device according to the collected brain wave, therefore, the wearer can control the application device by using his/her "thought" directly, and as a result, the wearable device can be used in special circumstances or by special populations. In addition, the wearable device includes therein a determination unit and a prompt unit, thus, after the determination unit obtains the wearer's possible thought (instruction) by analyzing the collected brain wave, the prompt unit may firstly send the thought to the wearer to confirm whether the thought is the wearer's real thought, and control information is sent out only after the thought is confirmed by the wearer. Therefore, accuracy of the instruction sent by the wearable device can be ensured and user experience is improved.

Because of the complexity of human brain, an instruction obtained by simply analyzing a brain wave is very likely to be wrong, and therefore, with the determination unit and the prompt unit, the wearable device of the embodiments can avoid many errors.

Figure 3:
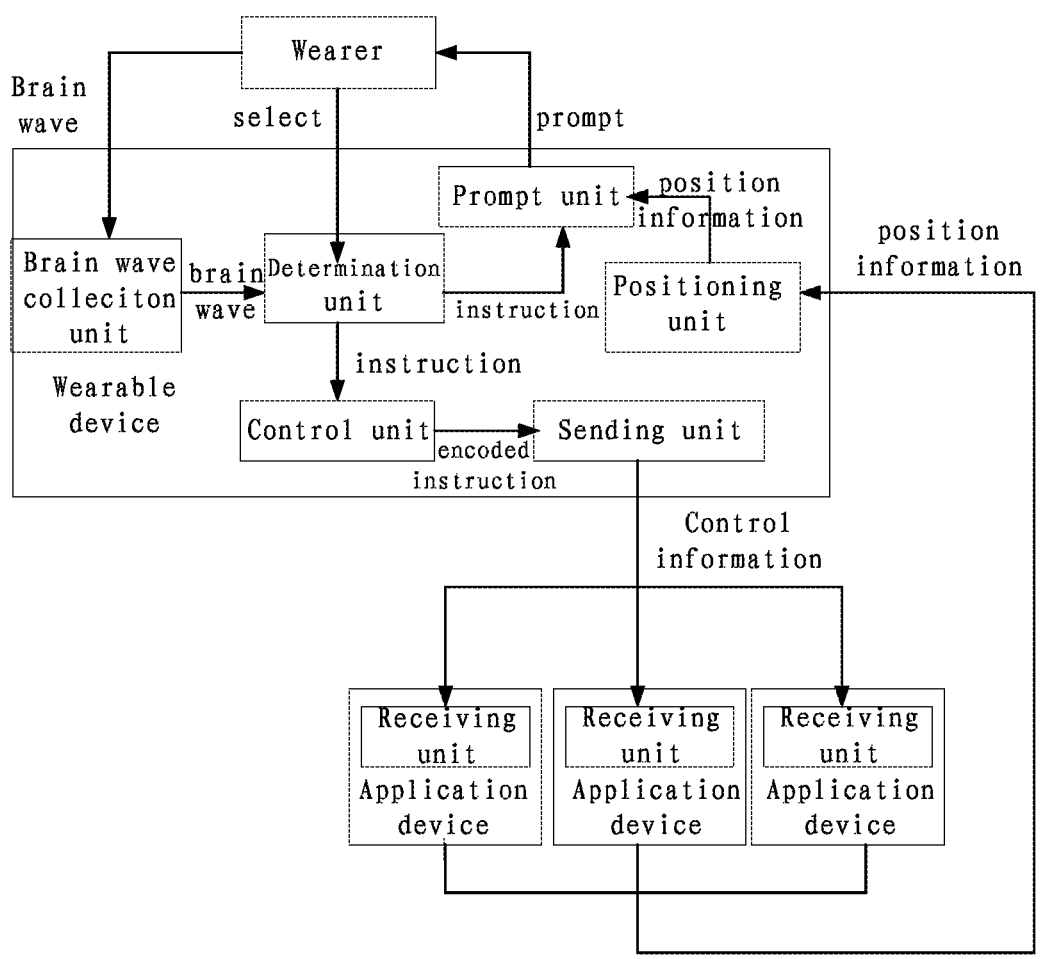
FIG. 3 is a block diagram of a structure of an application system according to an embodiment of the present invention.
Figure 4:
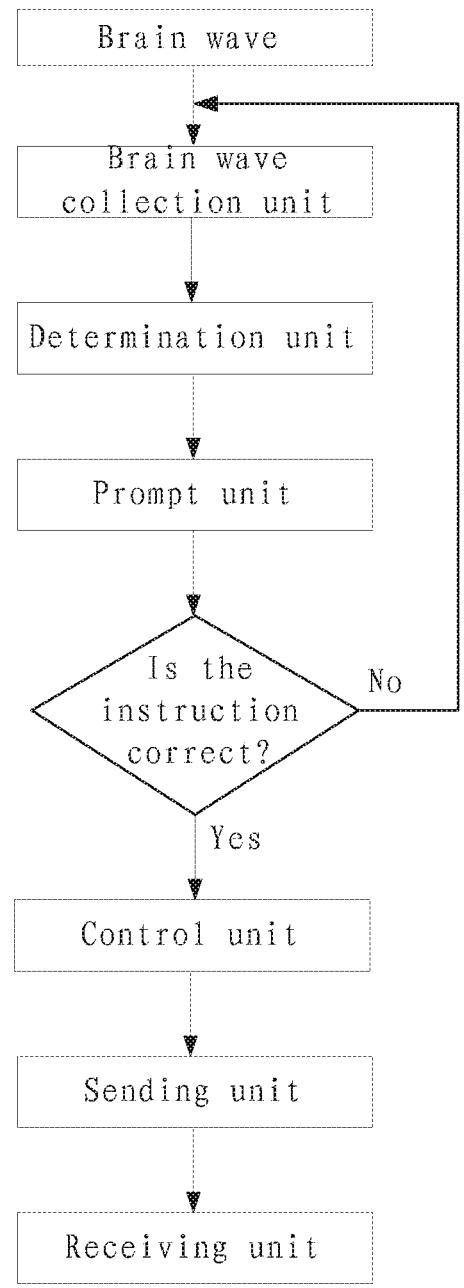
FIG. 4 is a schematic diagram illustrating an operating process of an application system according to an embodiment of the present invention.

In another aspect, as shown in FIGS. 3 and 4, the embodiments of the present invention provide an application system.

As shown in FIG. 3, the application system includes:
the above-described wearable device; and
at least one application device, each of which includes a receiving unit configured to receive and decode the control information sent from the sending unit of the wearable device, so that the application device operates according to the control information.

That is to say, the above-described wearable device and one or more application devices may form one system, and each application device receives the control information sent by the sending unit of the wearable device through the receiving unit, so that the application device performs a process correspondingly according to the control information.

FIG. 4 is a schematic diagram illustrating an operating process of an application system according to an embodiment of the present invention. As shown in FIG. 4, in the wearable device of the embodiments of the present invention, the brain wave collection unit first collects a brain wave and then sends the brain wave to the determination unit, the determination unit obtains an instruction according to the brain wave and sends the instruction to the prompt unit, the prompt unit sends out a prompt to let the wearer confirm whether the instruction is the wearer's real thought, the determination unit sends the instruction to the control unit if the instruction is the wearer's real thought, the control unit sends the instruction to the sending unit after encoding the instruction, and the sending unit sends control information to the receiving unit of a corresponding application device according to the received instruction, so as to cause the application device to execute the instruction.

Preferably, the application device includes a household application.

That is to say, the wearable device is preferably used to control household applications such as computers, televisions, refrigerators, washing machines, etc. Needless to say, it is also feasible to use the wearable device to control other type of devices (such as industrial devices).

Preferably, the application device is an IOT application device.

That is to say, the application device is preferably a device connected to the Internet of Things, and thus, the wearable device is equivalent to a controller in the Internet of Things and can be used to control each application device in the Internet of Things.

It can be understood that the foregoing implementations are merely exemplary implementations used for describing the principle of the present invention, but the present invention is not limited thereto. Those of ordinary skill in the art may make various variations and modifications without departing from the spirit and essence of the present invention, and these variations and modifications shall fall into the protection scope of the present invention.

The invention claimed is:

1. A wearable device, configured to be worn by a wearer and including:
   a brain wave collection unit, configured to collect a brain wave of the wearer;
   a determination unit, configured to obtain an instruction according to the brain wave collected by the brain wave collection unit and send the instruction to a sending unit; and
   the sending unit, configured to send control information to an application device according to the instruction sent from the determination unit; a prompt unit, wherein:
   the determination unit is configured to obtain an instruction according to the brain wave collected by the brain wave collection unit and send the instruction to the prompt unit;
   the prompt unit is configured to send a prompt to the wearer upon receipt of the instruction sent from the determination unit, the prompt including a prompt that reminds the wearer to confirm or cancel the instruction;
   the determination unit is further configured to receive a feedback from the prompt unit indicating that the wearer confirms or cancels the instruction, and send the instruction confirmed by the wearer to the sending unit after receiving the feedback indicating that the wearer confirms the instruction; and
   the sending unit is configured to send control information to the application device according to the instruction confirmed by the wearer and sent from the determination unit.

2. The wearable device of claim 1, wherein the determination unit obtains an instruction according to the brain wave collected by the brain wave collection unit and configured to:
   comparing the brain wave collected by the brain wave collection unit with electroencephalograms pre-stored in a database, and if an electroencephalogram matching the brain wave is found, setting an instruction corresponding to the electroencephalogram as the instruction; the database including instructions and the electroencephalograms in one-to-one correspondence.

3. The wearable device of claim 1, wherein the sending unit sends the control information to the application device wirelessly.

4. The wearable device of claim 2, wherein the prompt unit is configured to send the prompt to the wearer by way of playing a sound and/or displaying a picture.

5. The wearable device of claim 1, wherein the sending unit is a radio frequency transmission unit.

6. The wearable device of claim 5, wherein a transmission frequency of the radio frequency transmission unit is larger than or equal to 10 MHz.

7. The wearable device of claim 1, further including:
   a positioning unit, configured to obtain relative positional relation between the wearer and the application device and sending the obtained relative positional relation to the prompt unit; and
   wherein the prompt unit is further configured to send a prompt about the relative positional relation between the wearer and the application device to the wearer.

8. The wearable device of claim 1, further including:
   a control unit, configured to receive the instruction from the determination unit, encode the instruction and send the encoded instruction to the sending unit.

9. An application system, including:
   the wearable device of claim 1; and
   at least one application device, wherein each application device includes a receiving unit configured to receive and decode the control information sent from the sending unit of the wearable device, so that the application device operates according to the control information.

10. The application system of claim 9, wherein the application device includes a household application.

11. The application system of claim 9, wherein the application device is an Internet of Things application device.

* * * * *